(12) United States Patent
Zheng et al.

(10) Patent No.: US 10,924,908 B2
(45) Date of Patent: Feb. 16, 2021

(54) METHOD, SYSTEM, AND DEVICE FOR TRANSMITTING AN EMERGENCY MESSAGE

(71) Applicant: MOTOROLA SOLUTIONS, INC., Chicago, IL (US)

(72) Inventors: Jifeng Zheng, Sichuan (CN); Quanwen Du, Sichuan (CN); Zheng Zhong, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 203 days.

(21) Appl. No.: 16/095,741

(22) PCT Filed: May 6, 2016

(86) PCT No.: PCT/CN2016/081227
§ 371 (c)(1),
(2) Date: Oct. 23, 2018

(87) PCT Pub. No.: WO2017/190338
PCT Pub. Date: Nov. 9, 2017

(65) Prior Publication Data
US 2020/0336881 A1  Oct. 22, 2020

(51) Int. Cl.
*H04W 4/00* (2018.01)
*H04W 4/90* (2018.01)
(Continued)

(52) U.S. Cl.
CPC .............. *H04W 4/90* (2018.02); *H04L 51/26* (2013.01); *H04W 4/12* (2013.01)

(58) Field of Classification Search
CPC ............ H04W 4/90; H04W 4/12; H04L 51/26
See application file for complete search history.

(56) References Cited

U.S. PATENT DOCUMENTS 7,355,991 B2   4/2008   Huang et al.
7,715,352 B2   5/2010   Huang et al.
(Continued)

FOREIGN PATENT DOCUMENTS

| CN | 101567734 | 10/2009 |
| CN | 102905244 | 1/2013 |
| EP | 2555503   | 2/2013 |

OTHER PUBLICATIONS

PCT/CN2016/081227 International Search Report and Written Opinion of the International Searching Authority dated Jan. 4, 2017 (8 pages).

(Continued)

*Primary Examiner* — Khai M Nguyen
(74) *Attorney, Agent, or Firm* — Michael Best and Friedrich LLP

(57) ABSTRACT

A method and system for retransmitting an emergency message including receiving, at a communication device, the emergency message including a first identifier indicative of a communication type and a second identifier indicative of a type of emergency. An electronic processor of the communication device selects, for distribution of the emergency message, a plurality of communication channels and at least one communication type based on the second identifier. The electronic processor prioritizes the plurality of communication channels and the at least one communication type according to a transmission priority having a higher priority associated with at least one of the group consisting of the first identifier and the second identifier. Then, the electronic processor controls transmission of the emergency message according to the transmission priority over the plurality of communication channels and the at least one communication type.

20 Claims, 6 Drawing Sheets

(51) Int. Cl.
  *H04L 12/58* (2006.01)
  *H04W 4/12* (2009.01)

(56) References Cited

U.S. PATENT DOCUMENTS

| | | | |
|---|---|---|---|
| 8,630,191 B2 | 1/2014 | Forbes et al. | |
| 9,054,822 B2 | 6/2015 | Brown et al. | |
| 9,173,077 B2 * | 10/2015 | Siomina | H04W 4/90 |
| 9,344,532 B2 | 5/2016 | Corretjer et al. | |
| 10,582,255 B2 * | 3/2020 | Lee | H04N 21/8586 |
| 2012/0025979 A1 * | 2/2012 | Monnerie | H04L 61/35 |
| | | | 340/539.22 |
| 2014/0099910 A1 | 4/2014 | Corretjer et al. | |
| 2018/0165061 A1 * | 6/2018 | Nicolich-Henkin | |
| | | | H04L 12/282 |
| 2020/0015058 A1 * | 1/2020 | Wu | H04M 1/72538 |

OTHER PUBLICATIONS

Examination Report issued by the United Kingdom Intellectual Property Office for Application No. 1817601.6 dated Dec. 7, 2020 (3 pages).

* cited by examiner

METHOD, SYSTEM, AND DEVICE FOR TRANSMITTING AN EMERGENCY MESSAGE

BACKGROUND OF THE INVENTION

Emergency messages are often used in two-way radio systems to provide an alert associated with an incident, such as a public safety incident. A radio may transmit an emergency message on a currently-selected talkgroup channel. However, in some situations, the talkgroup channel may not include any other radios. Similarly, in some situations, even when the talkgroup channel includes other radios, the radios may be located outside of a coverage area of the talkgroup channel. Accordingly, in these situations, it is possible that no other radios will receive the emergency message. Moreover, in some situations, one or more radios may receive the emergency message but not retransmit the emergency message efficiently or may not transmit the emergency messages to all available communication devices within their range.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
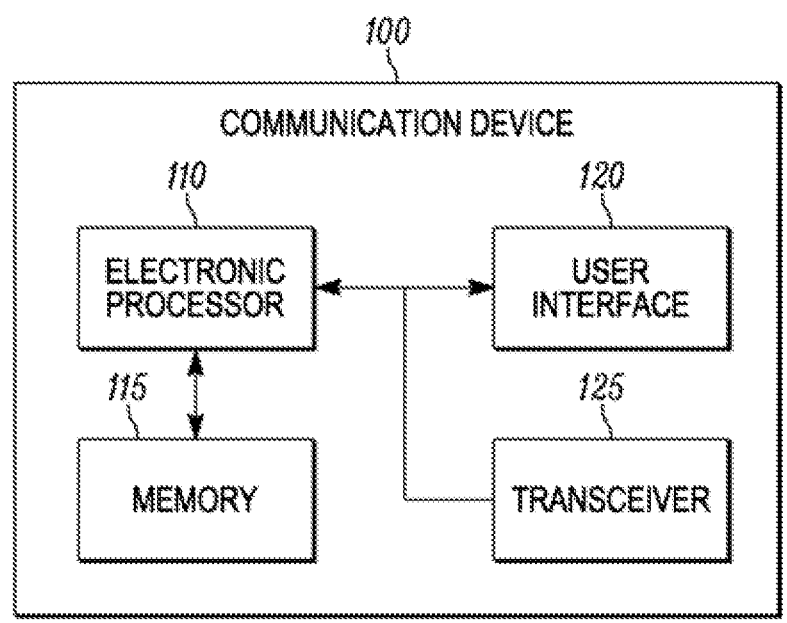
FIG. 1 is a diagram of a communication device configured to transmit an emergency message in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of retransmitting an emergency message. In one example, the method includes receiving, at a communication device, the emergency message including a first identifier indicative of a communication type and a second identifier indicative of a type of emergency. An electronic processor selects, for distribution of the emergency message, a plurality of communication channels and at least one communication type based on the second identifier. The electronic processor prioritizes the plurality of communication channels and the at least one communication type according to a transmission priority having a higher priority associated with at least one of the group consisting of the first identifier and the second identifier. Then, the electronic processor controls transmission of the emergency message according to the transmission priority over the plurality of communication channels and the at least one communication type.

Another embodiment provides a communication device for retransmitting an emergency message. The communication device includes at least one transceiver configured to receive and transmit the emergency message and an electronic processor. The electronic processor is configured to receive the emergency message including a first identifier indicative of a communication type and a second identifier indicative of a type of emergency. The electronic processor is further configured to select, for distribution of the emergency message, a plurality of communication channels and at least one communication type based on the second identifier. The electronic processor is further configured to prioritize the set of the plurality of communication channels and the at least one communication type according to a transmission priority. The transmission priority is based on at least one from the group consisting of the emergency type and the at least one communication type. The electronic processor is further configured to control transmission of the emergency message according to the transmission priority over the set of the plurality of communication channels and the at least one communication type.

FIG. 1 is a block diagram of a communication device 100 configured to receive and transmit an emergency message in accordance with some embodiments. The communication device 100 may be a portable, mobile, or stationary communication device. When portability is desired, the communication device 100 may be a mobile telephone, a smart telephone, a smart watch, a tablet computer, a portable radio, or similar device. The communication device 100 may operate within or over various communication networks and communication links. For example, the communication device 100 may communicatively couple to a cellular network, a land mobile radio network, a trunked radio network, a wireless local area network (for example, Wi-Fi® network), short range wireless network (for example, Bluetooth® network), or a combination of the foregoing. The communication device 100 may also communicate directly with other communication devices. For example, the communication device 100 may be configured to communicatively link to other communication devices via various forms of radio frequency (RF) communications.

In the exemplary embodiment illustrated in FIG. 1, the communication device 100 includes a plurality of electrical and electronic components that provide power, operational control, and protection to the components and modules within the communication device 100. The communication device 100 includes, among other things, an electronic processor 110 (for example, an electronic microprocessor, microcontroller, or similar device), a memory 115 (for example, non-transitory, computer-readable memory), a user interface 120, and a transceiver 125. The communication device 100 may also include additional or alternative components, including additional electronic processors and memory, or application specific integrated circuits (ASICs).

The components of the communication device 100 may be connected in various ways including, for example, a local bus. In the exemplary embodiment, the electronic processor 110 is communicatively coupled to the memory 115 and executes instructions stored on the memory 115. The electronic processor 110 is configured to retrieve from the memory 115 and execute, among other things, instructions related to the control processes and method described below.

The user interface 120 may include multiple input mechanisms including one or more buttons, dials, or selectable icons displayed on a screen. In some embodiments, the user interface 120 includes a touchscreen that performs at least portions of the input and output functionality of the communication device 100. For example, the user interface 120 may be configured to receive input (for example, input generated as a result of selections made via the touchscreen) and to display or output information and graphical elements (for example, on the touchscreen). In some embodiments, the electronic processor 110, executing software stored in memory 115, generates a graphical user interface that is displayed on the touchscreen and that includes selectable menus, selectable icons, and blank fields or text entry boxes to receive inputs relating to various parameters of the emergency message as described below.

Figure 2:
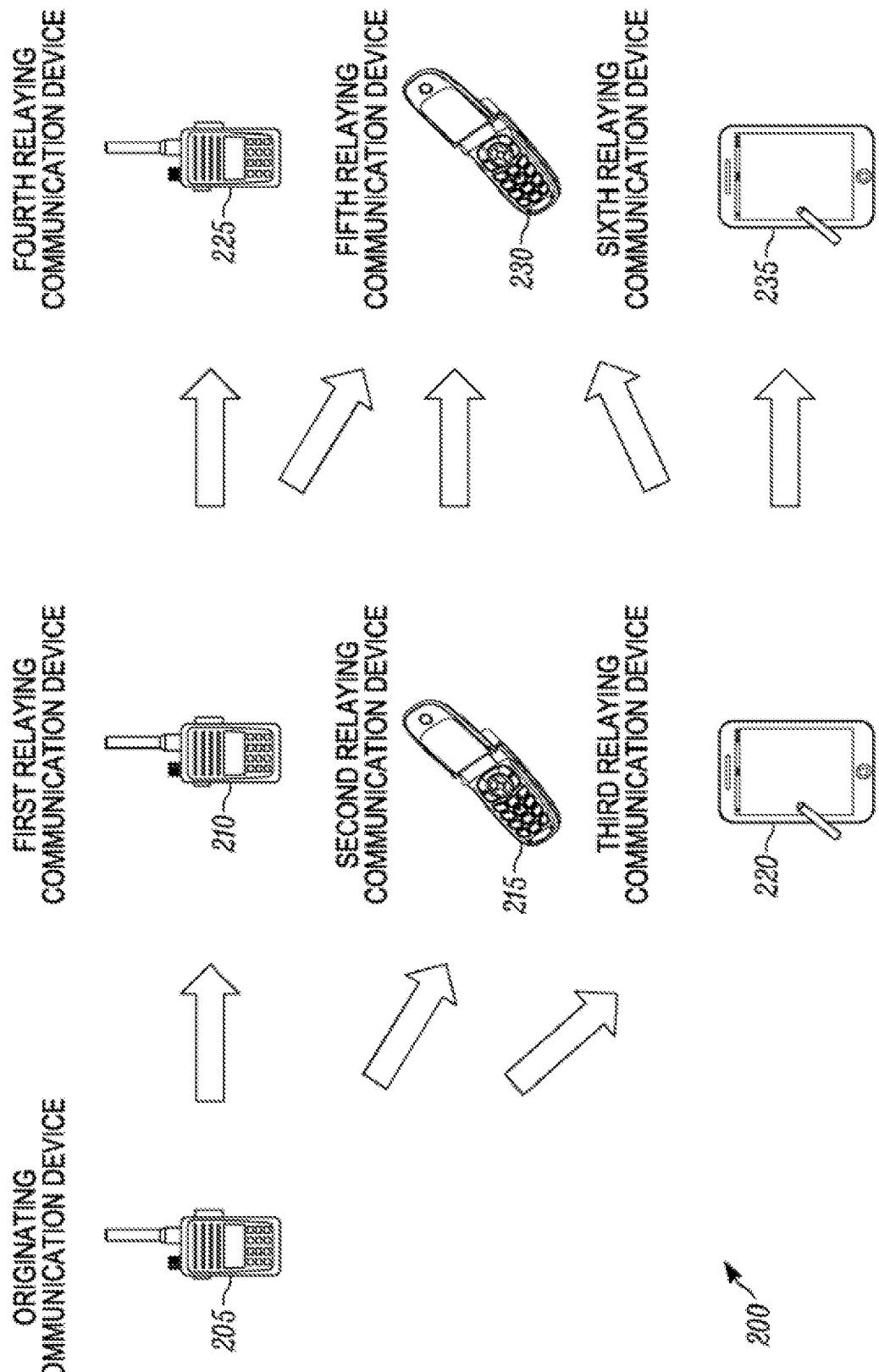
FIG. 2 is a diagram of a system of communication devices of the type illustrated in FIG. 1, which are configured to transmit the emergency message in accordance with some embodiments.

FIG. 2 illustrates a communication system 200. In the embodiment illustrated, the communication system 200 includes an originating communication device 205, a first relaying communication device 210, a second relaying communication device 215, a third relaying communication device 220, a fourth relaying communication device 225, a fifth relaying communication device 230, and a sixth relaying communication device 235. In one embodiment, the communication system 200 is a system of communication devices of the type illustrated in FIG. 1. For example, each communication device 205, 210, 215, 220, 225, 230, and 235 may be structurally similar to the communication device 100. Thus, for the sake of brevity, the processor, memory, I/O and other components of these devices are not described in detail. When referenced in the description that follows, it should be understood that each communication device 205, 210, 215, 220, 225, 230, and 235 and associated components may be of the type illustrated in FIG. 1.

It will be appreciated that each communication device 205, 210, 215, 220, 225, 230, and 235 may be different from the communication device 100 and vary in construction. For example, as illustrated, the originating communication device 205, the first relaying communication device 210, and the fourth relaying communication device 225 may be portable, two-way radios. The second relaying communication device 215 and the fifth relaying communication device 230 may be cellular telephones, and the third relaying communication device 220 and the sixth relaying communication device 235 may be portable computers (for example, tablet computers). In other embodiments, the communication system 200 may include fewer or additional communication devices. In addition, each communication device 100 may be a different type and be configured to operate over different communication types.

Based on the transmission capabilities of each communication device 100, the emergency message is transmitted throughout the communication system 200. For example, the originating communication device 205 generates the emergency message and transmits the emergency message via a two-way radio link to the first relaying communication device 210. The originating communication device 205 also transmits the emergency message via short-range communication link to the second relaying communication device 215 and transmits the emergency message via a local area network to the third relaying communication device 220.

As illustrated, each of the relaying communication devices may retransmit the emergency message to multiple other relaying communication devices over multiple communication links of different types. For example, the first relaying communication device 210 may transmit the emergency message via land mobile radio link to the fourth relaying communication device 225 and via a cellular link to the fifth relaying communication device 230. In some embodiments, the first relaying communication device 210 transmits the emergency message over all communication modalities available to that device, which may also include transmitting the emergency message via the local area network to the sixth relaying communication device 235.

Similarly, each of the relaying communication devices retransmits the emergency message, once received, to the other communication devices. For example, the second relaying communication device 215 may transmit the emergency message to the third relaying communication device 220, the fourth relaying communication device 225, the fifth relaying communication device 230, and back to the originating communication device 205. The relaying communication devices each retransmit the emergency message according to, at least in part, information embedded within the emergency message. In addition, each of the relaying communication devices may update a portion of the emergency message when the emergency message is retransmitted as described below.

Figure 3:
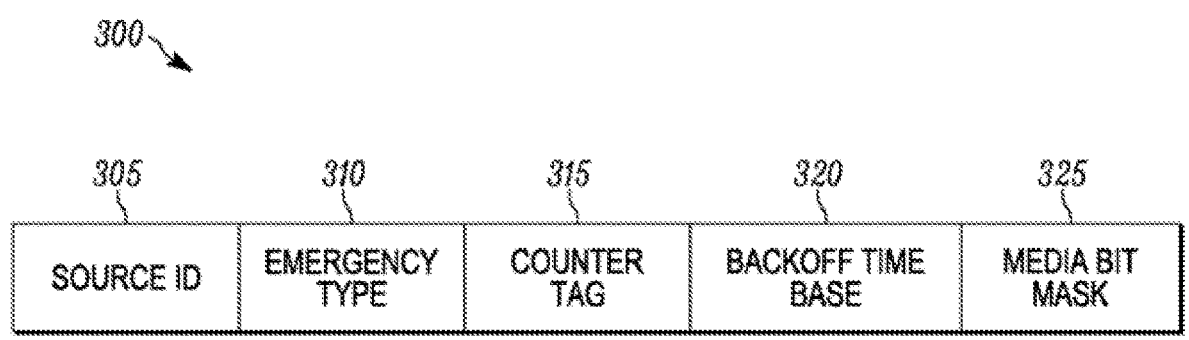
FIG. 3 is a diagram of the emergency message that is transmitted by the communication devices of FIG. 2 in accordance with some embodiments.

FIG. 3 is a block diagram of the emergency message 300 that is transmitted by the communication devices of FIG. 2 in accordance with some embodiments. When generating the emergency message 300, the originating communication device 205 embeds information within the emergency message 300. The embedded information may include various types of message content. In some embodiments, the embedded information includes a source identifier 305 (for example, a unique identification number), an emergency type 310 (for example, a descriptive label of a type of emergency), a counter tag 315, a back-off time base 320, and a media bit mask 325. Some of the embedded information is generated by the originating communication device 205 and remains fixed throughout retransmission. Alternatively, some of the embedded information may be updated by a relaying communication device before retransmission.

For example, upon generation of the emergency message 300, the originating communication device 205 sets the emergency type 310. The emergency type 310 may describe a particular type of emergency, for example, fire, injury, robbery, natural disaster, terrorism, and any other situation requiring immediate action. In these examples, each of the types of emergency may generally be associated with a particular group of users. In some embodiments, the association may occur at the originating communication device 205. In this case, the originating communication device 205 references its memory to determine the association between the emergency type and the group of users. The electronic processor of the originating communication device 205 may load a look-up table from device's memory that contains a list of communication channels, talkgroups, and communication types associated with the group of users. Once, the relevant associations are determined, the originating communication device 205 may transmit the emergency message 300 based at least in part on the relevant associations. In addition, since the emergency type is embedded within the emergency message 300, each of the relaying communication devices may retransmit the emergency message 300 based at least in part on the emergency type.

The counter tag 315 of the emergency message 300 is set by the originating communication device 205 and sets a number of retransmissions to perform for that particular emergency message 300. Each time the emergency message 300 is retransmitted by a relaying communication device, the counter tag 315 is adjusted. For example, the counter tag 315 may be decremented for each retransmission and when the counter tag 315 reaches a value of zero, the emergency message 300 is no longer relayed. In one example, the counter tag 315 is set to ten by the originating communication device 205, which then allows for ten transmissions before expiration of the emergency message 300.

The back-off time base 320 sets a time delay for retransmission of the emergency message 300. The time delay helps prevent interference or clogging of transmission channels. For example, when the originating communication device 205 transmits the emergency message 300 to multiple nearby relaying communication devices, each communication device 100 may attempt to retransmit the emergency message 300 simultaneously. In this case, congestion of the communication channels may occur and result in one or more failed transmissions. The back-off time base 320 prevents these problems by delaying retransmission of the emergency message 300 over various time periods. For example, the first relaying communication device 210 may have a time delay of sixty (60) milliseconds and the second relaying communication device 215 may have a time delay of one hundred twenty (120) milliseconds. As a consequence, the first relaying communication device 210 completes retransmission of the emergency message 300 before the second relaying communication device 215 attempts retransmission.

The media bit mask 325 of the emergency message 300 defines the communication type over which the emergency message 300 is transmitted. For example, when the originating communication device 205 transmits the emergency message 300 via land mobile radio, the originating communication device 205 sets the media bit mask 325 to a value indicative of land mobile radio transmission. Conversely, when the originating communication device 205 sends the emergency message 300 via the local area network, the originating communication device 205 sets the media bit mask 325 to a value indicative of local area network transmission. The media bit mask 325 may also be set (for example, reset) by relaying communication devices. For example, the first relaying communication device 210 may set the media bit mask 325 to a value indicative of a land mobile radio transmission when retransmitting the emergency message 300 via land mobile radio regardless of the communication type by which the emergency message 300 was received.

In some embodiments, the emergency message 300 contains additional message content generated by the originating communication device 205. For example, the originating communication device 205 may receive the additional message content via the user interface 120. The additional message content may contain text information, voice data, image data, video data, and the like. The additional message content enables customized emergency information and warnings.

The contents of the emergency message 300 may be set by the originating communication device 205 based on predetermined (for example, preprogrammed) settings. For example, the source identifier 305 may be assigned to the originating communication device 205 and automatically sent with all emergency messages originating from that device. Similarly, the media bit mask 325 may be automatically sent with all emergency messages and determined based solely on the communication type over which the emergency message 300 is sent. In some embodiments, the predetermined settings may be modified or updated by selections received via the user interface of the particular communication device. As a consequence, at least part of the emergency message 300 may be customized based on user preferences. For example, the counter tag 315 and the back-off time base 320 may be set based on input received from the user interface. In some embodiments, the emergency type 310, the counter tag 315, and the back-off time base 320 have default values that may be changed via the user interface for a particular transmission of the emergency message 300 or for all transmissions of emergency messages.

In some embodiments, the contents of the emergency message 300 are generated by selection on the user interface of the originating communication device 205 with or without having default values. In these embodiments, the originating communication device 205 may require entry of some of the contents of the emergency message 300 before transmission. For example, the emergency type 310 may be set based on input received via the user interface (for example, by selections received from a user). In some embodiments, the originating communication device 205 may be programmed to associate particular inputs with particular emergency types. For example, the originating communication device 205 may receive a selection of a "1" on the user interface, which has been previously associated with a fire emergency. In this case, the originating communication device 205 attaches the emergency type of "fire" to the emergency message 300. In other embodiments, the originating communication device 205 displays a menu of selectable emergency types on the user interface for selection by a user.

Figure 4:
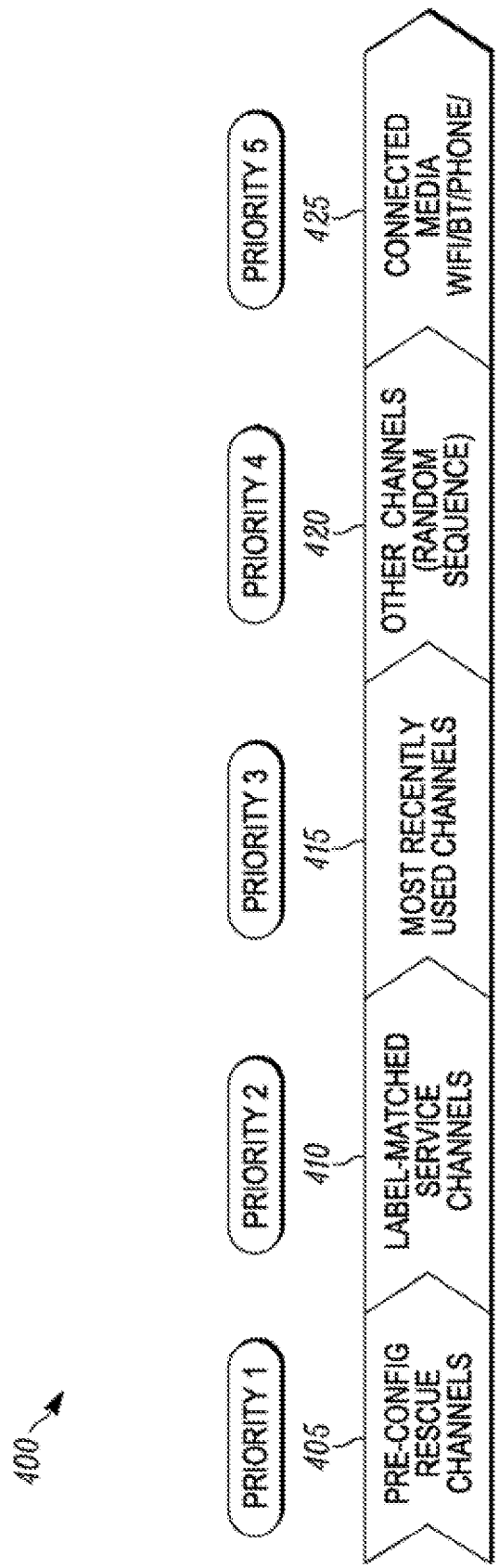
FIG. 4 is a diagram of a priority sequence for transmission of the emergency message using the system of communication devices of FIG. 2.

FIG. 4 is a block diagram of a priority sequence for transmission of the emergency message 300 using the communication devices of FIG. 2 according to some embodiments. In particular, in the embodiment illustrated, the emergency message 300 is transmitted by the originating communication device 205 according to a transmission priority 400. When a transmission having a higher priority than another transmission (for example, Priority 1 category is higher than Priority 2 category), the transmission having the higher priority is transmitted first and the transmission having the lower priority is transmitted second. For example, when the transmission has multiple levels of priority, as in the example illustrated, each transmission associated with a lower priority category is transmitted after all transmissions associated with all of the higher priority categories. In the embodiment illustrated, the Priority 1 category includes preconfigured rescue channels 405. Preconfigured rescue channels 405 are channels that enable various types of emergency transmission. In some embodiments, the preconfigured rescue channels 405 are reserved for certain types of emergencies. For example, a fire emergency may have one or more preconfigured rescue channels 405 that enable communication with fire rescue personnel.

The Priority 2 category for emergency message transmission includes label-matched service channels 410. Label-matched service channels 410 are associated with the emergency type 310, but are not reserved for emergency use (in contrast to the preconfigured rescue channels 405). For example, if the emergency type 310 is police, the originating communication device 205 transmits the emergency message 300 first on any preconfigured rescue channels 405 reserved for the police and second on label-matched service channels 410 of the police (for example, non-emergency channels). Other channels may also be associated with label-matched service channels 410. For example, the originating communication device 205 may associate multiple service channels, for example, service channels for local security with a particular emergency type 310.

A Priority 3 category for emergency message transmission includes radio channels that were the most recently-used channels 415 by the originating communication device 205. These most recently-used channels 415 may be general or specific use channels and may be associated with various talkgroups. Since last used, the most recently-used channels 415 have a higher likelihood of having other communication devices of the communication system 200 within transmission range.

A Priority 4 category for emergency message transmission includes the remaining channels 420 (those channels that have not yet been used for transmission of the emergency message 300). This may include all of the unconfigured radio channels. In some embodiments, the remaining channels 420 are selected by the originating communication device 205 in a random sequence. For example, the originating communication device 205 may use a random number generator to assign a sequence to the remaining channels 420. As a consequence, when the emergency message 300 is transmitted simultaneously among each communication device 100, different channels of the remaining channels 420 are prioritized and less conflicts occur during retransmission.

A Priority 5 category for emergency message transmission includes other communication types 425 that are available to the originating communication device 205. For example, when connected to a local area network, the originating communication device 205 transmits the emergency message 300 via the local area network while transmitting as the Priority 5 category. When connected to multiple other communication types, the originating communication device 205 may continue to transmit the emergency message 300 until each of the other communication types 425 have been utilized. For example, the originating communication device 205 may transmit the emergency message 300 via local area network, short range wireless, and cellular in a predetermined order or in a random order.

In some embodiments, each of the relaying communication devices also use the transmission priority 400 illustrated in FIG. 4. In this case, the relaying communication devices are preconfigured to relay the emergency message 300 according to the transmission priority 400. However, the relaying communication devices may also be configured with an alternative priority sequence. For example, the relaying communication devices may prioritize communication according to the media bit mask 325 that is received with the emergency message 300. In particular, the relaying communication devices may have the particular communication type that is identified by the media bit mask 325 as occurring prior to the Priority 1 category. In these embodiments, each of the relaying communication devices retransmits the emergency message 300 to each communication device 100 that is available via the communication type identified by the media bit mask 325. For example, when receiving the emergency message 300 via short range wireless, the third relaying communication device 220 sends the emergency message 300 to the sixth relaying communication device 235 via short range wireless prior to sending the emergency message 300 to the fifth relaying communication device 230 via cellular. As a consequence, the emergency message 300 is rapidly propagated over different communication types. In these embodiments, the priority sequence may otherwise follow the order indicated by FIG. 4 or follow other predetermined orders.

In some embodiments, the channels described with reference to FIG. 4 (for example, the preconfigured rescue channels 405, the label-matched service channels 410, the most recently-used channels 415, and the remaining channels 420) are predefined frequency bands for radio frequency transmission. In other embodiments, the channels may operate across multiple frequencies depending on the configuration of the radio system. For example, the channels may hop frequencies based on a communication protocol implemented. In these embodiments, the transmission priority 400 may include transmission over particular frequency bands. For example, during the Priority 4 category transmission, the communication device 100 may transmit the emergency message 300 via a random sequence of frequencies.

Figure 5:
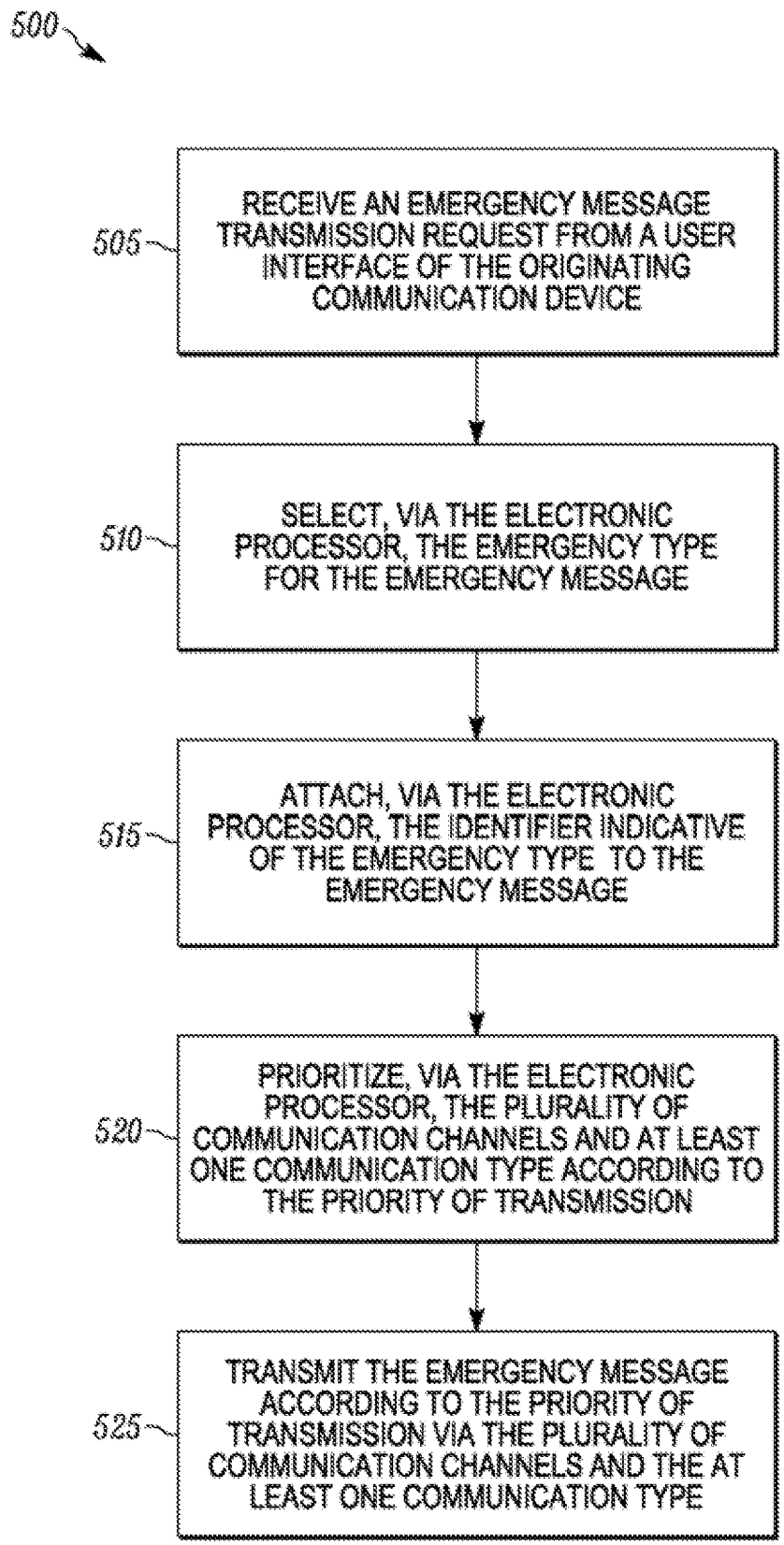
FIG. 5 is a flowchart of a method of originating the emergency message using the system of communication devices of FIG. 2 in accordance with some embodiments.

FIG. 5 is a flowchart of a method 500 of transmitting the emergency message 300 from an originating mobile device using the system of communication devices of FIG. 2 in accordance with some embodiments. In the method 500, an emergency message transmission request is received from the user interface of the originating communication device 205 (block 505). An electronic processor of the originating communication device 205 selects the emergency type for the emergency message 300 (block 510). As indicated above, the selection of the emergency type may be based on an emergency type selected on the user interface. The electronic processor attaches the identifier indicative of the emergency type to the emergency message 300 (block 515). The electronic processor prioritizes the plurality of communication channels and at least one communication type according to the transmission priority 400 (block 520). The originating communication device 205 transmits the emergency message 300 according to the transmission priority 400 via the plurality of communication channels and the at least one communication type (block 525).

Figure 6:
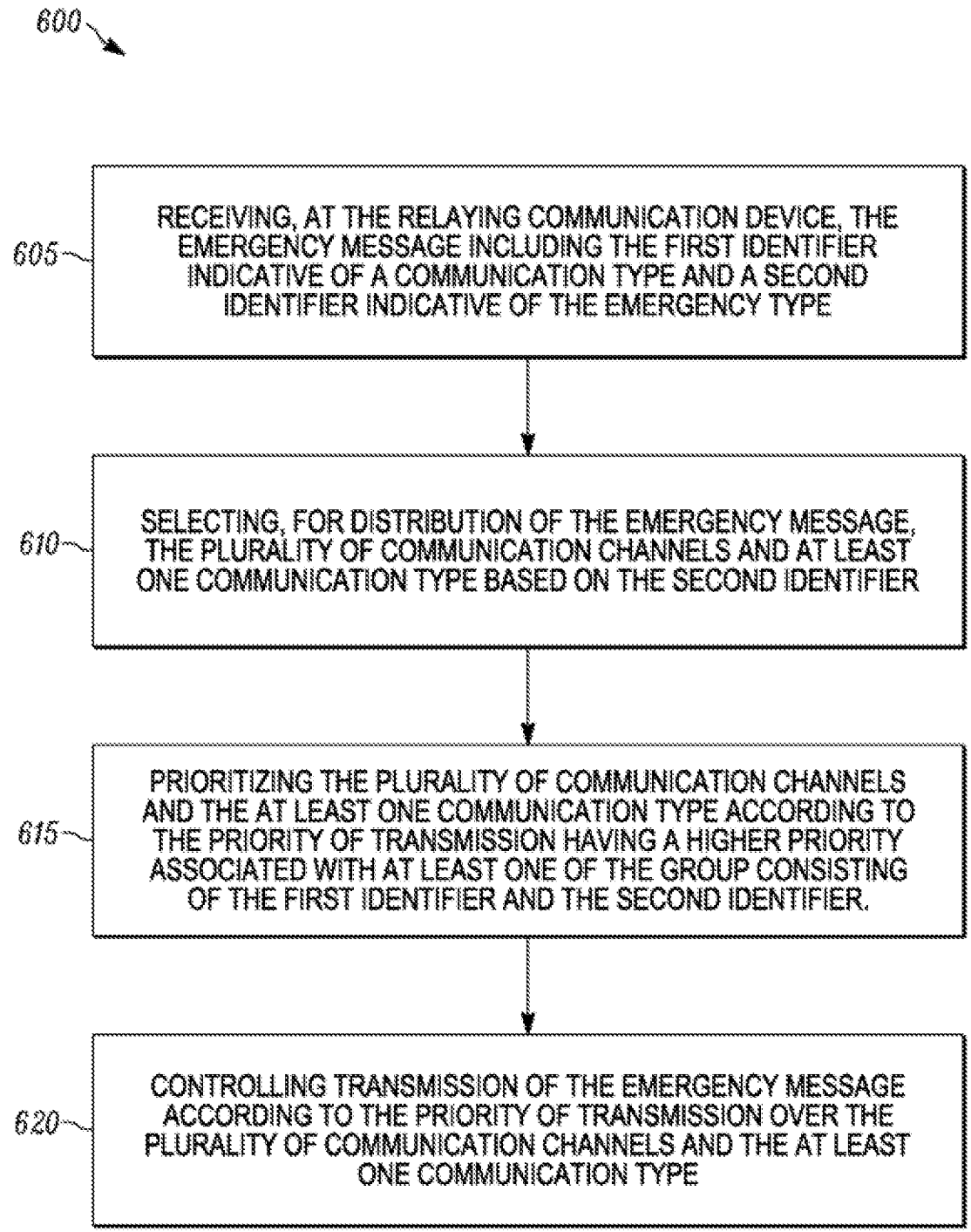
FIG. 6 is a flowchart of a method of relaying the emergency message using the system of communication devices of FIG. 2 in accordance with some embodiments.

FIG. 6 is a flowchart of a method 600 of relaying the emergency message 300 using the communication devices of FIG. 2 in accordance with some embodiments. In one example of the method 600, the first relaying communication device 210 receives the emergency message 300 including a first identifier indicative of the communication type (for example, via the media bit mask 325) and a second identifier indicative of the emergency type 310 (block 605). An electronic processor of the first relaying communication device 210 selects, for distribution of the emergency message 300, the plurality of communication channels and at least one communication type based on the second identifier (block 610). The electronic processor prioritizes the plurality of communication channels and the at least one communication type according to the transmission priority having a higher priority associated with at least one of the group consisting of the first identifier and the second identifier (block 615). The electronic processor controls the transmission of the emergency message 300 according to the transmission priority over the plurality of communication channels and the at least one communication type (block 620).

The method 600 may be performed by each communication device of the communication system 200. As a consequence, the emergency message 300 may be propagated throughout the communication system 200. In some embodiments, each communication device that transmits the emergency message 300 also stores a record of transmission of the particular emergency message 300 into its memory. The record of transmission may include some or all of the message content illustrated in FIG. 3. When the communication device receives a transmission of an emergency message 300 that it had previously transmitted, the communication device does not retransmit the emergency message 300. In some embodiments, when receiving the emergency message 300, the communication device may compare the incoming emergency message 300 to any previously sent emergency messages to determine a match, and when the incoming emergency message 300 matches with the previously-sent emergency message 300, the emergency message 300 is not retransmitted.

In other embodiments, when a communication device first receives the emergency message 300, the communication device stores the counter tag 315 from the emergency message 300 into its memory. When the communication device receives the emergency message 300 a second time, the emergency message 300 will have a counter tag with a lower value. This indicates that the emergency message 300 was previously transmitted by the communication device. As a consequence, the communication device does not retransmit the emergency message 300.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of distributing an emergency message via a communication device, the method comprising:
receiving, at a communication device, the emergency message including a first identifier indicative of a communication type and a second identifier indicative of a type of emergency;
selecting, for distribution of the emergency message, a plurality of communication channels and at least one communication type based on the second identifier;
prioritizing, via an electronic processor, the plurality of communication channels and the at least one communication type according to a transmission priority having a higher priority associated with at least one of the group consisting of the first identifier and the second identifier; and controlling transmission of the emergency message according to the transmission priority over the plurality of communication channels and the at least one communication type.

2. The method of claim 1, wherein selecting, for distribution of the emergency message, the plurality of communication channels and the at least one communication type includes referencing a list stored in a memory of the communication device and associated with the emergency type, the list including the plurality of communication channels.

3. The method of claim 1, wherein prioritizing, via the electronic processor, the plurality of communication channels and the at least one communication type according to the transmission priority includes selecting the emergency type as a higher priority than the at least one communication type.

4. The method of claim 1, wherein prioritizing, via the electronic processor, the plurality of communication channels and the at least one communication type according to a transmission priority includes selecting the at least one communication type as a higher priority than the emergency type.

5. The method of claim 1, wherein prioritizing, via the electronic processor, the plurality of communication channels and the at least one communication type according to the transmission priority includes selecting a preconfigured emergency channel as a first priority and wherein controlling transmission of the emergency message according to the transmission priority over the plurality of communication channels and the at least one communication type occurs first via the preconfigured emergency channel.

6. The method of claim 5, wherein prioritizing, via the electronic processor, the plurality of communication channels and the at least one communication type according to the transmission priority includes selecting at least one transmission channel associated with the emergency type as a lower priority than the preconfigured emergency channel and wherein controlling transmission of the emergency message according to the transmission priority over the plurality of communication channels and the at least one communication type occurs via the at least one transmission channel associated with the emergency type after transmitting the emergency message via the preconfigured emergency channel.

7. The method of claim 6, wherein prioritizing, via the electronic processor, the plurality of communication channels and the at least one communication type according to the transmission priority includes selecting a most recently-used channel as a lower priority than the at least one transmission channel associated with the emergency type and wherein controlling transmission of the emergency message according to the transmission priority over the plurality of communication channels and the at least one communication type occurs via the most recently-used channel after transmitting the emergency message via the at least one transmission channel associated with the emergency type.

8. The method of claim 7, wherein prioritizing, via the electronic processor, the plurality of communication channels and the at least one communication type according to the transmission priority includes selecting unconfigured radio channels as a lower priority than the most recently-used channel and wherein controlling transmission of the emergency message according to the transmission priority over the plurality of communication channels and the at least one communication type occurs via the unconfigured radio channels after transmitting the emergency message via the most recently-used channel.

9. The method of claim 8, wherein selecting unconfigured radio channels occurs in a random sequence for each of the unconfigured radio channels.

10. The method of claim 8, wherein prioritizing, via the electronic processor, the plurality of communication channels and the at least one communication type according to the transmission priority includes selecting unconfigured communication types as a lower priority than the unconfigured radio channels and wherein controlling transmission of the emergency message according to the transmission priority over the plurality of communication channels and the at least one communication type occurs via the unconfigured communication types after transmitting the emergency message via the unconfigured radio channels.

11. The method of claim 10, wherein selecting, for distribution of the emergency message, the plurality of communication channels and the at least one communication type based on the second identifier is also based on the first identifier.

12. A communication device for retransmitting an emergency message, the communication device comprising:
at least one transceiver configured to receive and transmit the emergency message; and
an electronic processor, the electronic processor configured to
receive the emergency message including a first identifier indicative of a communication type and a second identifier indicative of a type of emergency;
select, for distribution of the emergency message, a plurality of communication channels and at least one communication type based on the second identifier;
prioritize the set of the plurality of communication channels and the at least one communication type according to a transmission priority, the transmission priority based on at least one from the group consisting of the emergency type and the at least one communication type; and
control transmission of the emergency message according to the transmission priority over the set of the plurality of communication channels and the at least one communication type.

13. The communication device of claim 12, wherein the electronic processor is further configured to reference a list stored in a memory of the communication device and associated with the emergency type, the list including the set of the plurality of communication channels and the at least one communication type.

14. The communication device of claim 12, wherein the electronic processor is further configured to prioritize the set of the plurality of communication channels and the at least one communication type according to a transmission priority by selecting the emergency type as a higher priority than the at least one communication type.

15. The communication device of claim 12, wherein the electronic processor is further configured to prioritize the set of the plurality of communication channels and the at least one communication type according to a transmission priority by selecting the at least one communication type as a higher priority than the emergency type.

16. The communication device of claim 12, wherein the electronic processor is further configured to
prioritize the set of the plurality of communication channels and the at least one communication type according to a transmission priority by selecting a preconfigured emergency channel as a first priority; and control transmission of the emergency message according to the transmission priority over the set of the plurality of communication channels and the at least one communication type by first using the preconfigured emergency channel.

17. The communication device of claim 12, wherein the electronic processor is further configured to prioritize the set of the plurality of communication channels and the at least one communication type according to a transmission priority by selecting at least one transmission channel associated with the emergency type as a lower priority than the preconfigured emergency channel; and control transmission of the emergency message according to the transmission priority over the set of the plurality of communication channels and the at least one communication type by using the at least one transmission channel associated with the emergency type after controlling transmission of the emergency message over the preconfigured emergency channel.

18. The communication device of claim 17, wherein the electronic processor is further configured to prioritize the set of the plurality of communication channels and the at least one communication type according to a transmission priority by selecting a most recently-used channel as a lower priority than the at least one transmission channel associated with the emergency type; and control transmission of the emergency message according to the transmission priority over the set of the plurality of communication channels and the at least one communication type by using the most recently-used channel after controlling transmission of the emergency message over the at least one transmission channel associated with the emergency type.

19. The communication device of claim 18, wherein the electronic processor is further configured to prioritize the set of the plurality of communication channels and the at least one communication type according to a transmission priority by selecting unconfigured radio channels as a lower priority than the most recently-used channel; and control transmission of the emergency message according to the transmission priority over the set of the plurality of communication channels and the at least one communication type by using the unconfigured radio channels after controlling transmission of the emergency message over the most recently-used channel.

20. A method of transmitting an emergency message, the method comprising:

receiving an emergency message from a user interface of a communication device;

selecting, via an electronic processor, an emergency type for the emergency message;

attaching, via the electronic processor, an identifier indicative of the emergency type to the emergency message;

selecting, via the electronic processor, a plurality of communication channels and at least one communication type based on the selection of the emergency type;

prioritizing, via the electronic processor, the plurality of communication channels and the at least one communication type according to a transmission priority, the transmission priority based on at least one from the group consisting of the emergency type and the at least one communication type; and transmitting the emergency message according to the transmission priority via the plurality of communication channels and the at least one communication type.

* * * * *